United States Patent [19]

Forman et al.

[11] 4,179,782

[45] Dec. 25, 1979

[54] CABLE TERMINAL-FERRULE ATTACHING APPARATUS

[75] Inventors: Donald B. Forman; Phillip Bradshaw, both of San Diego, Calif.

[73] Assignee: The United States of America as represented by the Secretary of the Navy, Washington, D.C.

[21] Appl. No.: 902,013

[22] Filed: May 1, 1978

[51] Int. Cl.² .............................................. B23P 19/04
[52] U.S. Cl. ........................................ 29/268; 81/304; 81/425 A
[58] Field of Search ................ 29/268, 280, 229, 758; 81/5.1 R, 425 R, 425 A, 426, 304, 312

[56] References Cited

U.S. PATENT DOCUMENTS

| 966,500 | 8/1910 | Wegner | 81/5.1 R |
|---|---|---|---|
| 1,085,461 | 1/1914 | Michaelis | 29/268 |
| 2,440,040 | 4/1948 | Burton | 81/5.1 R |
| 3,390,561 | 7/1968 | Finck | 29/268 |

*Primary Examiner*—James L. Jones, Jr.
*Attorney, Agent, or Firm*—R. S. Sciascia; G. J. Rubens

[57] ABSTRACT

Apparatus for attaching a cable terminal to a ferrule using a snap ring to achieve a rotatable connection wherein one jaw of the apparatus supports the terminal, a second jaw supports the ferrule, and an intermediate third jaw supports and compresses the snap ring. With the snap ring initially mounted on the terminal, closing the jaws together compresses the snap ring so that the terminal can be fully inserted into the ferrule until the snap ring is captured within the ferrule and completing the connection.

9 Claims, 5 Drawing Figures

CABLE TERMINAL-FERRULE ATTACHING APPARATUS

BACKGROUND OF THE INVENTION

The invention relates to tools and more particularly to a plier-like hand tool for connecting two members through a snap ring, such as connecting a cable terminal within a ferrule.

Rotatably connecting two separable connector halves by means of a snap ring is a common technique. In the past, such assembling has been performed by a conventional pair of pliers together with other conventional tools which requires great dexterity, especially where the connector parts are small in size, as in fiber optic terminal connections. In addition, any accidental misalignment between the terminal and the ferrule when the pliers are squeezed together will damage the connector parts as well as cause breakage of the fiber optic cables. The above described practice is further complicated where the installation must be conducted in field installations where space may be confined, and in inclement weather especially when wearing gloves.

SUMMARY OF THE INVENTION

A tool is provided for connecting a ferrule, a cable terminal, and a snap ring which fits over the terminal and within a ferrule groove to lock the parts together to allow relative rotation. The tool in the preferred embodiment is a plier-like hand tool having a pair of outer jaws each provided with a handle. The free ends of both jaws each have a drilled opening, one opening to receive and support the terminal and the other jaw opening to receive and support the cable ferrule to be secured around the terminal. A third jaw is positioned intermediate the outer pair of jaws and freely pivoted thereto. The third jaw is formed with a funnel-shaped drilled opening to receive the snap ring which has been initially assembled on the terminal between the terminal shoulders. The openings in all through jaws are in longitudinal alignment.

To initiate operation of the tool, the terminal and preassembled snap ring is positioned by the operator in the opening of one said pair of jaws. The ferrule is seated in the opening of the other of said pair of jaws, and the ferrule may be maintained in seated position by the operator applying a pressure on the freely pivotal intermediate jaw.

As the outer jaws are squeezed together, the terminal with the preassembled snap ring is pushed through the funnel-shaped opening in the intermediate jaw, and the snap ring is cammed radially inwardly until it is compressed fully within the spaced shoulders. In this position, a further application of pressure on the handles will push the termianl fully within the ferrule until the snap ring is aligned with and engages the annular slot with the ferrule bore at which time the terminal is locked into the ferrule. The assembled ferrule and terminal are removed from the tool and are free to rotate independently but longitudinally confined by the snap ring.

STATEMENT OF OBJECTS OF THE INVENTION

A principal object of this invention is to provide a simple tool that will be capable of easily assembling two telescopic members that are to be locked together by a snap ring positioned therebetween.

Another important object is to provide a portable plier-like hand tool suitable for use in field installations for attaching ferrules to fiber optic cable terminals without damage to the fiber optic cable or connection parts.

DESCRIPTION OF THE PREFERRED EMBODIMENT

Figure 1:
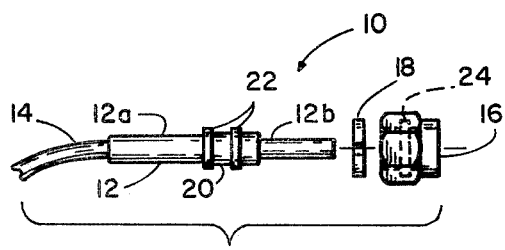
FIG. 1 is an exploded side elevation view of the three components to be assembled by the novel tool of this invention.

Referring to the drawings where like reference numerals refer to similar parts throughout the figures there is shown in FIG. 1, the unassembled parts of a conventional fiber optic cable terminal connection 10 comprising a terminal 12 having an epoxied a fiber optic cable 14, a ferrule 16 for threadedly connecting the cable to a system component (not shown), and a snap ring 18 for rotatably connecting together the other parts.

Snap ring 18 is designed to be fitted into groove 20 between spaced annular terminal shoulders 22 and into internal annular groove 24 in the bore of ferrule 16 to lock the parts together while permitting relative rotation.

Figure 2:
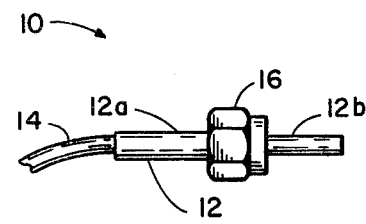
FIG. 2 is a similar view as FIG. 1 showing the parts having been assembled by the invention tool.
Figure 3:
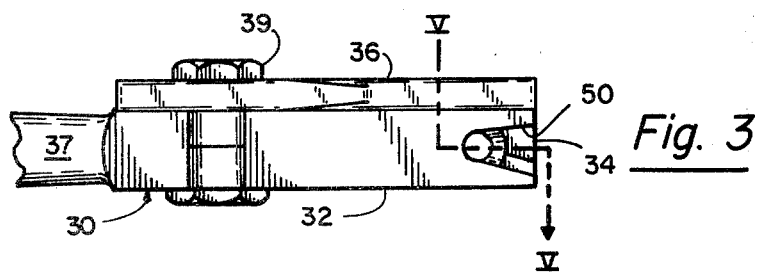
FIG. 3 is a side elevation view of the invention tool showing the openings in the respective jaws in longitudinal alignment.
Figure 5:
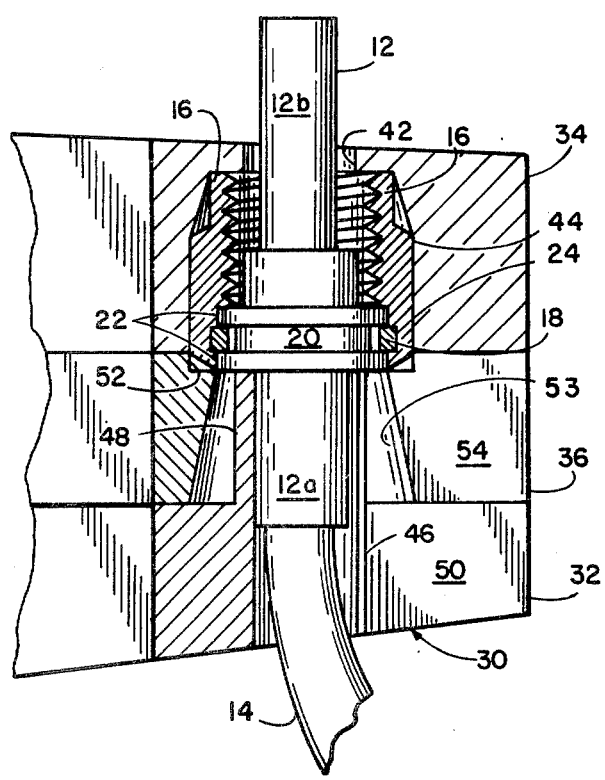
FIG. 5 is a cross section taken through the tool along lines V—V of FIG. 3 showing the completed assembled terminal connection enclosed within the jaws in their closed position.
Figure 4:
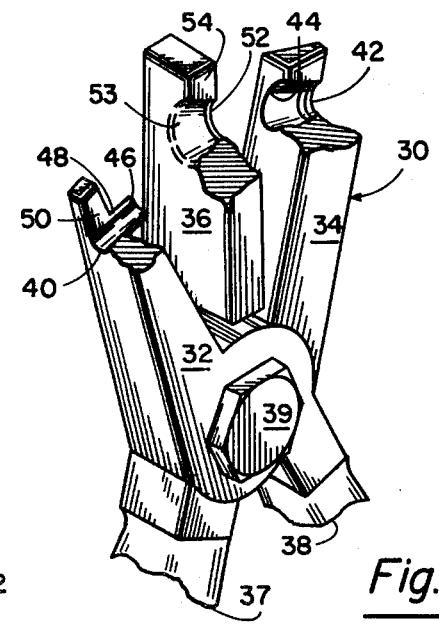
FIG. 4 is a perspective view of the invention tool with the jaws partially broken away to show the details of their openings.

The novel tool 30 of FIGS. 3 to 5 is designed to compress terminal 12, ferrule 16, and snap ring 18 of FIG. 1 into the finished assembly of FIG. 2.

In the preferred embodiment, tool 30 is designed as a plier-like hand tool capable of facilitating fiber optic cable terminal assemblies in field installations, where space may be limited and cramped and assembly performed under adverse weather conditions. In such an environment, a simple and expedient manner of assembly of such terminals is most desirable. It should be noted, however, that the invention is not limited for use as a hand tool, nor to the assembly of fiber optic cable connections.

Tool 30 comprises a pair of outer jaws 32 and 34, and an intermediate jaw 36. Outer jaws 32 and 34, are constructed with handle portions 38 and 37 respectively, which are pivoted together by bolt 39. Although FIG. 3 shows intermediate jaw 36 hinged on one side of the jaws, the particular manner of mounting jaw 36 is not significant to the invention concept and can be otherwise arranged.

The free end of jaws 32 and 34 are formed respectively with drilled openings 40 and 42 extending through each jaw to accommodate both ends 12a and 12b of terminal 12. The inner side of opening 42 in jaw 34 has an enlarged recessed portion 44 for seating ferrule 16, as best shown in FIG. 5.

Opening 40 of jaw 32 is provided with an inwardly extending cradle portion 46 for supporting supported portion 12a of the terminal. The free end of the cradle is designed to engage outer terminal shoulder 22 to push the terminal into ferrule 16, cradle 46 has an upper slotted portion 48 as does the free end of jaw 40 at 50 coextensive with slot 48. Both slots 48 and 50 are of a width that will allow passage of cable 14 only when the cable and terminal is supported in the cradle. It has been found that the terminal can best be supported within cradle axially from a lateral position with the jaws open. This arrangement eliminates the need for the operator to use his fingers to hold the terminal in the cradle when the jaws are squeezed together, also permitting quick removal of the assembled connection from the tool jaws.

The third and intermediate jaw 36 is freely pivoted at one end on pin 39, and at its other end is also provided with a drilled opening 52 extending therethrough being aligned with openings 40 and 42 in the outer pair of jaws. The end of jaw 36 is slotted at 54, similar to slot 50 in jaw 32, also for the purpose of enabling the free passage of cable 14 after the terminal and ferrule have been assembled by the tool. Opening 52 has a tapered portion 53 having its enlarged end facing cradle 46 on jaw 32. The tapered surface functions to radially compress snap ring 18 inwardly so as to be completely housed between terminal shoulders 22, as the tool is squeezed. This camming action permits entry of the terminal and compressed snap ring into ferrule 16 until snap ring 18 is mated with, and is captured by annular groove 24 inside the ferrule. This action locks the terminal within the ferrule, but allows the terminal and ferrule to rotate relatively avoiding breakage of the cable during installation and use.

Intermediate jaw 36 can also serve to keep ferrule 16 seated in recess 44 and in a properly aligned position within opening 42 when the connector parts are initially assembled into the tool prior to the squeezing action. This result can be achieved by operator's finger pressure on intermediate jaw against ferrule 16 until the jaws are brought together.

The following initial steps are taken preparatory to the assembly operation by novel tool 30. A loose ferrule 16 is seated in ferrule recess 44 in a properly oriented position. Intermediate jaw is then pivoted against the seated ferrule 16 which is firmly clamped in that position by pressure on the intermediate jaw by operator fingers. Snap ring 18 is then forced into place between terminal shoulders 22. In the usual application, cable 14 has been epoxied or otherwise secured within terminal 12. With jaw 32 in a fully open position, terminal 12 is slipped into opening 53 of jaw 36 and into the end of cradle 46 of jaw 32 until the end of the craddle engages terminal shoulder 22. Terminal cable 14 can be inserted in the tool traversely through slot 50 of jaw 32.

With terminal 12 and ferrule 16 firmly seated in their respective jaw openings, handles 37 and 38 are gradually squeezed together by the operator. As terminal 12 is pushed by craddle 46 through openings 52 and 42 in jaws 36 and 34, respectively, snap ring 18 is engaged by tapered surface 53 and is radially compressed until it is totally housed within terminal shoulder groove 20. At this point upon further squeezing action, terminal 12 is now free to move further into ferrule 16, as terminal shoulders 22 and snap ring 18 are smaller in diameter than intermediate jaw opening 52 and the bore of ferrule 16. Terminal 12 continues to move into ferrule until snap ring 18 is radially aligned with and is free to engage ferrule groove 24 at which time the terminal 12 is rotatably locked into ferrule 16. In this position the terminal is almost completely housed in jaw 34, and the opening of jaw 34 with respect to jaws 36 and 32 allows the terminal to be slipped back out of jaw 34 and cable 14 is free to be removed from jaws 32 and 36 through their slotted ends 50 and 54, respectively.

The single tool of this invention enables a terminal to be connected to a ferrule in a simple and expedient manner eliminating the necessity to rely on other tools. When the tool is fabricated as a hand pliers, it can be used in field installations where space is at a minimum and by unskilled operators.

Obviously, many other modifications and variations of the present invention are possible in the light of the above teachings. It is therefore to be understood that within the scope of the appended claims the invention may be practiced otherwise than as specifically described.

What is claimed is:

1. Compression apparatus for connecting a snap ring between a pair of members, one member having a pair of spaced outer annular shoulders forming an outer groove and the other member being a ferrule having an annular bore groove, the snap ring being adapted to be positioned within said grooves comprising:
   a pair of first and second jaws movably mounted together for compression of said members therebetween;
   said first jaw having an opening extending therethrough for seating one of said members;
   said second jaw having an opening extending therethrough for receiving the other said member;
   said first jaw having a projecting portion coextensive with its respective opening for applying a pressure against said one member;
   a third jaw positioned between said pair of jaws and having an opening extending therethrough of a size for receiving said first member;
   the openings in said first, second, and third jaws being in longitudinal alignment;
   means on said third jaw for radially compressing inwardly the snap ring;
   whereby compression of the first and second jaws together will cause the snap ring to be cammed radially inwardly and positioned between the spaced terminal shoulders of said one member allowing said one member to be inserted into the said second member until the snap ring is captured between the grooves in the two members rotatably to secure them together.

2. The apparatus of claim 1 wherein each of said first and second jaws have bifurcated ends contiguous with their respective recesses to facilitate insertion and removal of the members from the tool.

3. The apparatus of claim 1 wherein said projecting portion on the first jaw is formed as a split sleeve extending from the inner face of the jaw toward the third jaw.

4. The apparatus of claim 3 wherein said split sleeve forms a cradle for engaging a major portion of a periphery of said one member when supported therein, and for contacting a shoulder on said one member.

5. The apparatus of claim 1 wherein said three jaws are pivoted together, with the first and second jaws having handle portions.

6. The apparatus of claim 1 wherein the opening in said third jaw is funnel-shaped, the narrow portion of which funnel opening is slightly larger than the diameter of the bore opening in the ferrule to enable said one member and the compressed snap ring to be fully inserted into the ferrule bore as the jaws are compressed together until the snap ring engages the annular bore groove in the ferrule.

7. A hand tool for connecting a snap ring between a cable terminal having a pair of spaced outer annular shoulders and a cable ferrule having an annular bore groove comprising:
 a pair of first and second jaws having handle portions pivotally connected together;
 said second jaw having an opening extending therethrough for seating the ferrule;
 said first jaw having an opening extending therethrough for receiving the terminal;
 said first jaw having means for pushing the terminal into the ferrule;
 a third jaw positioned between and freely pivoted to said pair of jaws;
 said third jaw having a funnel-shaped opening to receive the snap ring assembled between the spaced shoulders on the terminal;
 the openings in the three jaws being in longitudinal alignment;
 the smaller end of said funnel-shaped opening on the third jaw having a diameter the same or slightly larger than the diameter of the ferrule bore to enable the snap ring when radially compressed by the camming action of the funnel-shaped opening to be inserted with the terminal into the ferrule for seating the snap ring with the annular bore groove in the ferrule.

8. The hand tool of claim 7 wherein the means on the first jaw is a cradle shaped member coextensive with the respective jaw opening.

9. The hand tool of claim 7 where said first and second jaws have bifurcated ends coextensive with the openings in the respective jaws to permit passage of the terminal cable.

* * * * *